(12) United States Patent
Cofta et al.

(10) Patent No.: US 7,853,793 B2
(45) Date of Patent: Dec. 14, 2010

(54) TRUSTED SIGNATURE WITH KEY ACCESS PERMISSIONS

(76) Inventors: Piotr Cofta, 86 Tritonville Rd., Sandymount, Dublin (IE); Olli Immonen, Tuohuskuja 16 A 5, Helsinki (FI) FIN-00670

( * ) Notice: Subject to any disclaimer, the term of this patent is extended or adjusted under 35 U.S.C. 154(b) by 1102 days.

(21) Appl. No.: 10/838,642

(22) Filed: May 3, 2004

(65) Prior Publication Data
US 2005/0246539 A1 Nov. 3, 2005

(51) Int. Cl.
*H04L 9/30* (2006.01)
(52) U.S. Cl. .................. 713/176; 713/172; 726/1; 726/21; 726/27; 380/277
(58) Field of Classification Search ................ None
See application file for complete search history.

(56) References Cited

U.S. PATENT DOCUMENTS

| | | | |
|---|---|---|---|
| 5,818,936 A | 10/1998 | Mashayekhi | |
| 6,446,206 B1 | 9/2002 | Feldbaum | |
| 6,470,450 B1 * | 10/2002 | Langford et al. | 713/182 |
| 6,848,048 B1 * | 1/2005 | Holmes | 713/162 |
| 6,983,364 B2 * | 1/2006 | Gougeon | 713/2 |
| 7,216,083 B2 * | 5/2007 | Parmelee et al. | 705/1 |
| 7,242,768 B2 * | 7/2007 | Challener | 380/44 |
| 7,409,552 B2 * | 8/2008 | Buttyan et al. | 713/172 |
| 2003/0005289 A1 | 1/2003 | Gougeon et al. | |
| 2003/0138105 A1 * | 7/2003 | Challener et al. | 380/277 |

FOREIGN PATENT DOCUMENTS

WO WO 01/93212 12/2001

OTHER PUBLICATIONS

Security and Trust Services API (SATSA) Java 2 Platform, Micro Edition, Version 1.0, Sun Microsystems, Inc., Copyright 2004, pp. 157-159.*
"Security and Trust Services API (SATSA) for JavaTM 2 Platform, Micro Edition", Oct. 2003, Sun Microsystems, Retrieved from the Internet on Oct. 26, 2008: <URL: https://cds.sun.com/is-bin/INTERSHOP.enfinity/WFS/CDS-CDS_JCP-Site/en_US/-/USD/ViewFilteredProducts-SimpleBundleDownload>.*
"Trusted Computing Platform Alliance (TCPA) Main Specification", Feb. 2002, Trusted Computing Group, Retrieved from the Internet on Oct. 26, 2008: <URL: https://www.trustedcomputinggroup.org/specs/TPM/TCPA_Main_TCG_Architecture_v1_1b.pdf>.*
Microsoft Computer Dictionary, 2002, Microsoft, 5rh Edition, pp. 211, 252.*
"keytool—Key and Certificate Management Tool", 2002, Retrieved from the Internet on Nov. 8, 2009: <URL:http://java.sun.com/j2se/1.4.2/docs/tooldocs/windows/keytool.html>.*
Java™ Cryptoraphy Extension (JCE) Reference Guide for the Java™ 2 SDK, Standard Edition, v 1.4, java.sun.com, May 6, 2005, 62 psgs.
Security and Trust Services API (SATSA) for Java™ 2 Platform, Micro Edition, Version 1.0, Sun Microsystems, Inc., Copyright 2004, pp. 1-200.

(Continued)

*Primary Examiner*—Minh Dinh

(57) ABSTRACT

Devices, methods, and computer code products are disclosed in which access to private keys required to create digital signatures for delimited information is controlled by permissions in the device. The permissions can be used to check the identity of an application to determine if the application has access to a digital key and permission to generate a digital signature.

17 Claims, 4 Drawing Sheets

OTHER PUBLICATIONS

International Search Report and Written Opinion for PCT/IB/2005/001190 mailed on Sep. 22, 2005.

PCT International Preliminary Report on Patentability for PCT/IB/2005/001190 completed on Apr. 3, 2006.

* cited by examiner

TRUSTED SIGNATURE WITH KEY ACCESS PERMISSIONS

FIELD OF THE INVENTION

The present invention relates generally to the field of document authentication. More specifically, the present invention relates to digital signatures used to verify the authenticity of an electronic file.

BACKGROUND INFORMATION

A digital signature is basically a way to ensure that an electronic document, such as an email, spreadsheet, file, etc., is authentic. Authentic can mean that the receiver knows who created the document and that the document has not been altered in any way since the document was created. In essence, a digital signature allows the creator of a document to "sign" the document with a secret key so that others with a matching public key can verify the document must have been signed only by the holder of the secret key.

Digital signatures can use what are known as "public key cryptography," which employs an algorithm using two different but mathematically related "keys," one for creating a digital signature or transforming data into a seemingly unintelligible form, and another key for verifying a digital signature or returning the message to its original form. Computer equipment and software utilizing two such keys are often collectively termed an "asymmetric cryptosystem."

The complementary keys of an asymmetric cryptosystem for digital signatures can be termed the private key, which is known only to the signer and used to create the digital signature, and a public key, which is ordinarily more widely known and can be used by the relying party to verify the digital signature. If many people need to verify the signer's digital signatures, the public key can be made available or distributed to all of them, perhaps by publication in an on-line repository or directory where it is easily accessible. Although the keys of the pair are mathematically related, if the asymmetric cryptosystem has been designed and implemented securely it is computationally infeasible to derive the private key from knowledge of the public key. Thus, although many people may know the public key of a given signer and use it to verify that signer's signatures, they cannot discover the signer's private key and use it to forge digital signatures. This is sometimes referred to as the principle of irreversibility.

Digital signatures can be used in connection with hash functions to also guarantee that a document has not been altered since it was signed by the creator. A hash function can be generally described as a computation done on a message, which produces a small "fingerprint" of the document in the form of a hash value. Hash values are typically of a standard length, which is much smaller than the message but nevertheless substantially related to the message. Any change to the message invariably produces a different hash result when the same hash function is used.

In the case of a secure hash function, sometimes termed a "one-way hash function," it is computationally infeasible to devise the original message from knowledge of its hash value and also infeasible to create a different message with the same hash value. Hash functions therefore enable the software for creating digital signatures to operate on smaller and predictable amounts of data, while still providing robust correlation to the original message content, thereby efficiently providing assurance that there has been no modification of the message since it was digitally signed.

In practice, digital signatures are used to sign the hash values of messages not the messages themselves. To sign a document or any other item of information, the signer first delimits precisely the borders of what is to be signed. The delimited information to be signed can be termed the "message." Then a hash function in the signer's software can compute a hash result unique (for all practical purposes) to the message. The signer's software then transforms the hash result into a digital signature using the signer's private key. The resulting digital signature is thus unique to both the message and the private key used to create it. Typically, a digital signature (a digitally signed hash result of the message) is attached to its message and stored or transmitted with its message. However, it may also be sent or stored as a separate data element, so long as it maintains a reliable association with its message.

Verification of a digital signature can be accomplished by computing a new hash result of the original message by means of the same hash function used to create the digital signature. Then, using the public key and the new hash result, the verifier can determine whether the digital signature was created using the corresponding private key and whether the newly computed hash result matches the original hash result which was transformed into the digital signature during the signing process. Verification software can be used to confirm that the digital signature as verified is the signer's private key as used to digitally sign the message (which is known to be the case if the signer's public key was used to verify the signature because the signer's public key will verify only a digital signature created with the signer's private key) and that the message was unaltered (which is know to be the case if the hash result computed by the verifier is identical to the hash result extracted from the digital signature during the verification process).

One challenge presented by the use of digital signatures is keeping the signer's private key secure. In some systems, the one Application, or possibly API, may be responsible for creating the hash value and signing the hash value with the signer's private key, as well as presenting the information to be delimited to the user, passing the delimited information to the hash function, and passing the hash value on for signing. If the application is implemented correctly and is trusted, this usually does not present a problem. However, if the application is rogue or is poorly implemented, the delimited information may be mishandled causing the information that is ultimately hashed and signed to be different from that delimited by the user.

Poorly implemented or rogue applications can create the problem of scavenging of private information such as the private key. The deployment of a private key to a device can, many cases, be a significant and expensive undertaking. In order to recover this investment, companies deploying private keys expect that they are the only one able to use such a key. Poorly implemented or rogue application may make it possible for someone to scavenge the company's private key.

In some applications, the private key, as well as other private information, may reside on a smart card. In this case, the user is typically required to provide a PIN to the smart card which performs the signing operation using the private key. If the PIN is collected by a poorly implemented or rogue application the system becomes vulnerable to scavenging of the PIN, which could allow anyone to access and use the private key and other private information on the smart card. On the other hand, if the card collects the PIN with the help of some embedded software, usability suffers as the user is required to separately delimit the information for signing and provide the PIN for unblocking the private key on the card.

As such, there is a need for an improved device, method and computer code product for implementing digital signatures.

SUMMARY OF THE INVENTION

Various embodiments of devices, methods and computer code products are disclosed according to the present invention. The various embodiment includes devices, methods and computer code products for using permissions to control access to private keys used in creating digital signatures. In one embodiment, the access to private keys used to create digital signatures for delimited information is controlled by permissions. Multiple private keys can be used wherein the private keys are stored in a hierarchical namespace structure such that one permission class with the hierarchical namespace can be used to control access to the multiple private keys. Alternatively, each private key can be stored in a unique place and separate permissions are used to control access to each of the multiple keys. The permission can be configured in any number of ways. For example, the permission could be a new JAVA standard permission that is designed for controlling access to the private key and permission could be granted by the owner of the private key either directly or indirectly.

DETAILED DESCRIPTION OF THE PREFERRED EMBODIMENTS

Many currently available devices, methods and computer code products for generating digital signatures can be vulnerable to tampering and/or private key scavenging. Java Cryptography Extension (JCE) is one example of a device, method and computer code product for generating a digital signature. JCE is a set of packages that provide a framework and implementations for encryption, key generation and key agreement, and Message Authentication Code (MAC) algorithms. Support for encryption includes symmetric, asymmetric, block, and stream ciphers. The software also supports secure streams and sealed objects.

Figure 1:
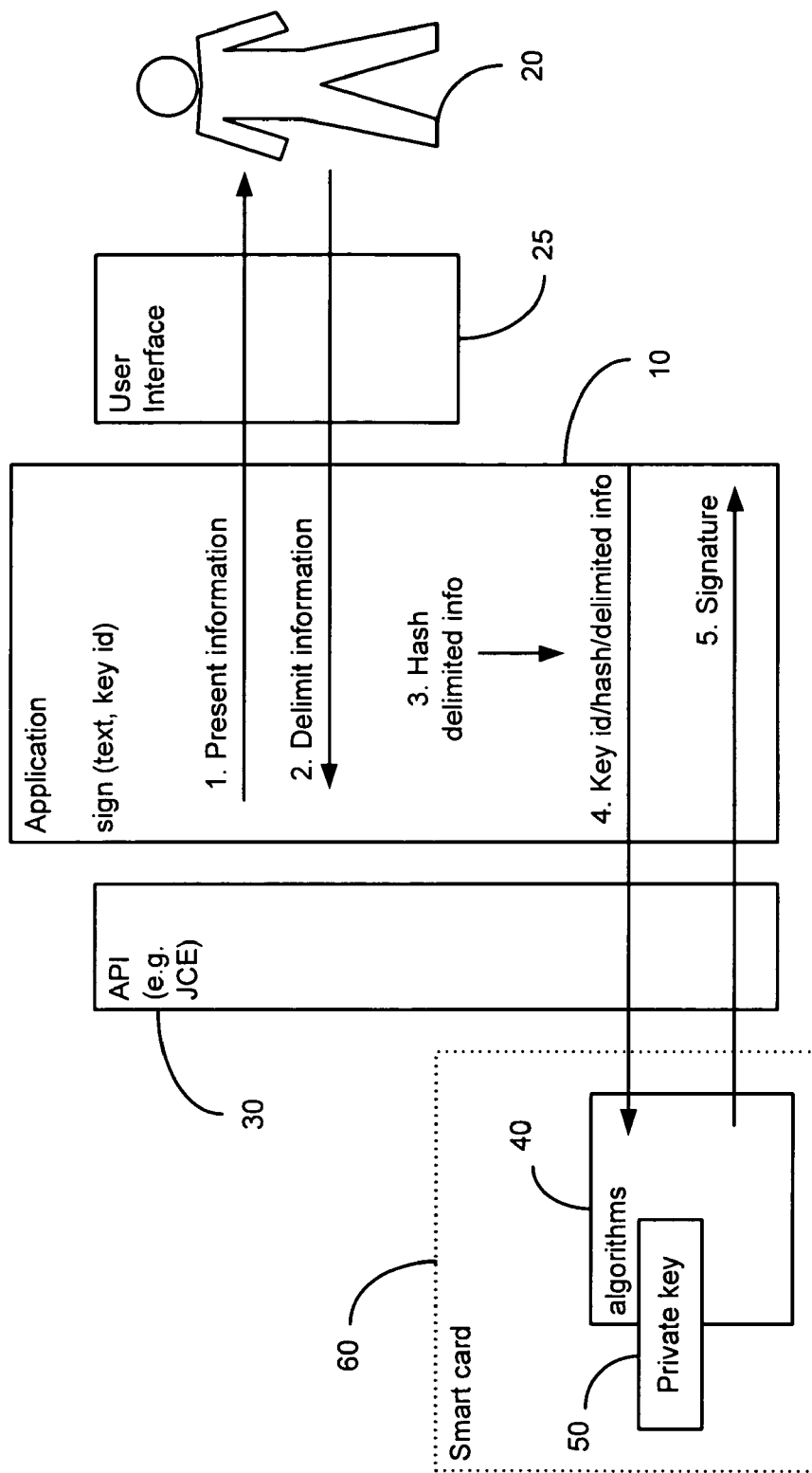
FIG. 1 is a block diagram of a prior art device for implementing digital signatures.

FIG. 1 illustrates a conventional signing process as it is performed using a JCE API 30. The process comprises primarily five steps. In step 1, an application 10 presents the user 20 with information with a user interface 25. The user 20 can delimit (select and accept) the information for signing and the delimited information is made available to the application 10 in step 2. The application 10 computes a hash value for the delimited information using a hash function in step 3. In step 4 the key id, the hash value and possibility the delimited information is passed through an API 30 to the proper cryptographic algorithm/key combinations. In the example shown in FIG. 1, the cryptographic algorithm 40 and private key 50 are stored on a smart card 60. The cryptographic algorithm 40 generates a digital signature using the hash value and the private key 50 and passes the digital certificate back to the algorithm 10. If the key 50 is stored on the smart card 60, there may be the additional step of obtaining the PIN to unlock the card 60.

Figure 2:
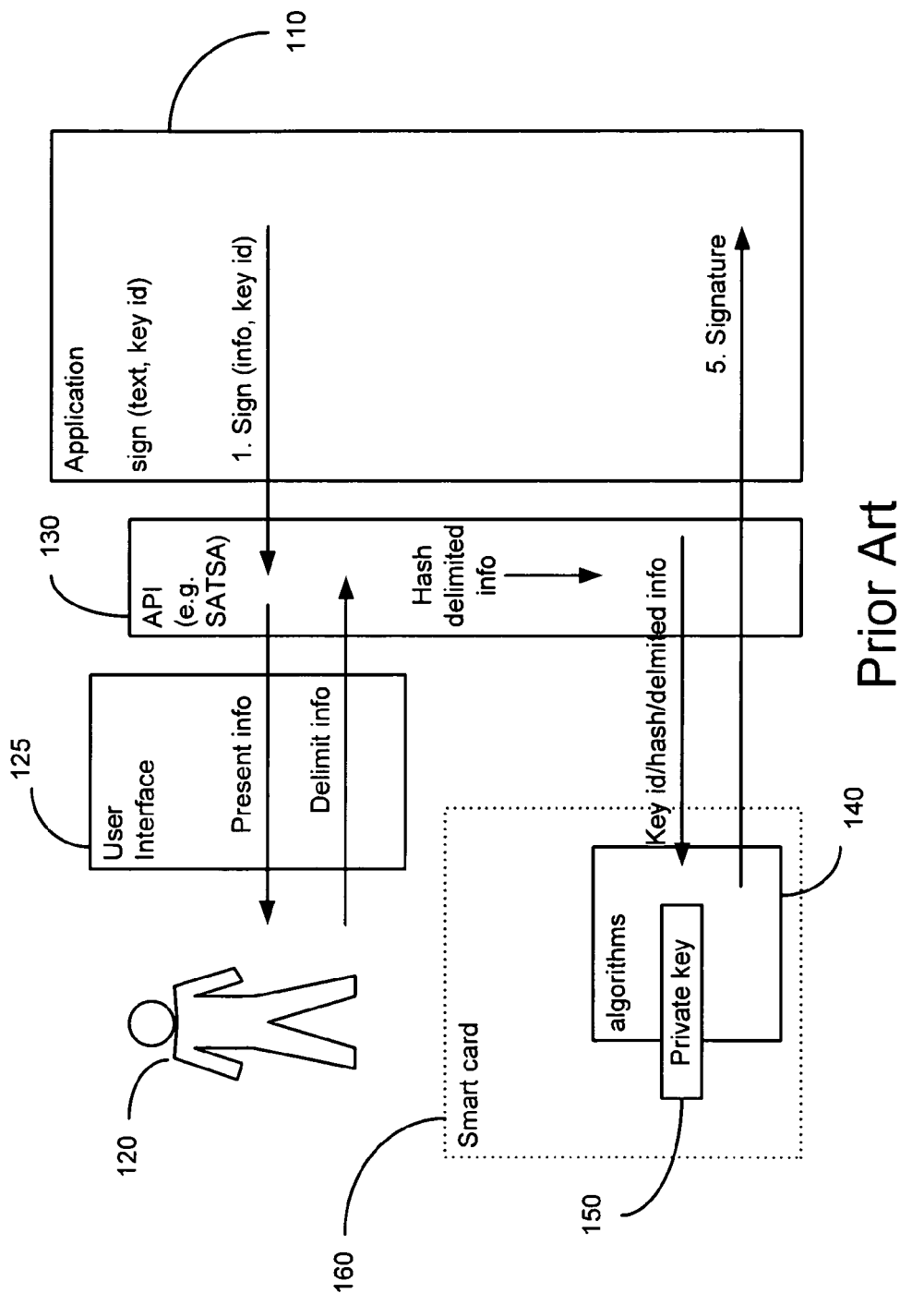
FIG. 2 is a block diagram of another prior art device for implementing digital signatures.

FIG. 2 illustrates another conventional process for generating a digital signature. This example uses the Security and Trust Services API (SATSA) 130. SATSA is an optional JAVA package that provides a security and trust API. This client API provides access to services provided by a security elements (such as smart card 160), including secure storage and retrieval of sensitive information, as well as encryption and authentication services.

In this example, the application 110 presents information to the user 120 through the API 130 and the user 120 delimits the information to be signed and passes the delimited information back to the API 130. The API 130 calculates a hash value for the delimited information and send the key id, hash value and possibly the delimited information to cryptographic algorithms 140 stored on the smart card 160. The cryptographic algorithms 140 use a private key 150, also stored on the smart card 160 to create a digital signature and the digital signatures is passed through the API 130 back to the application 110. In this example, the API 130 consumes the information being presented by the application 110 and presents it to the user 110.

One disadvantage in this arrangement is that the information can only be presented to the user 120 in ways understood by the API 130. Generally, the user 120 benefits if the application 110 presents the information, as it can do it in the most appropriate format. For example, data in XML format can be more properly presented by the application 110. Similarly, the wide range of possible formats and algorithms used for signing can be better accommodated by the modularity provided by the application 110. Thus, it is possible that the application 110 may have a special manner or style of presenting information which cannot be conveyed by the API 130. As such, the user 120 may not get the full experience as intended by the application 110.

Figure 3:
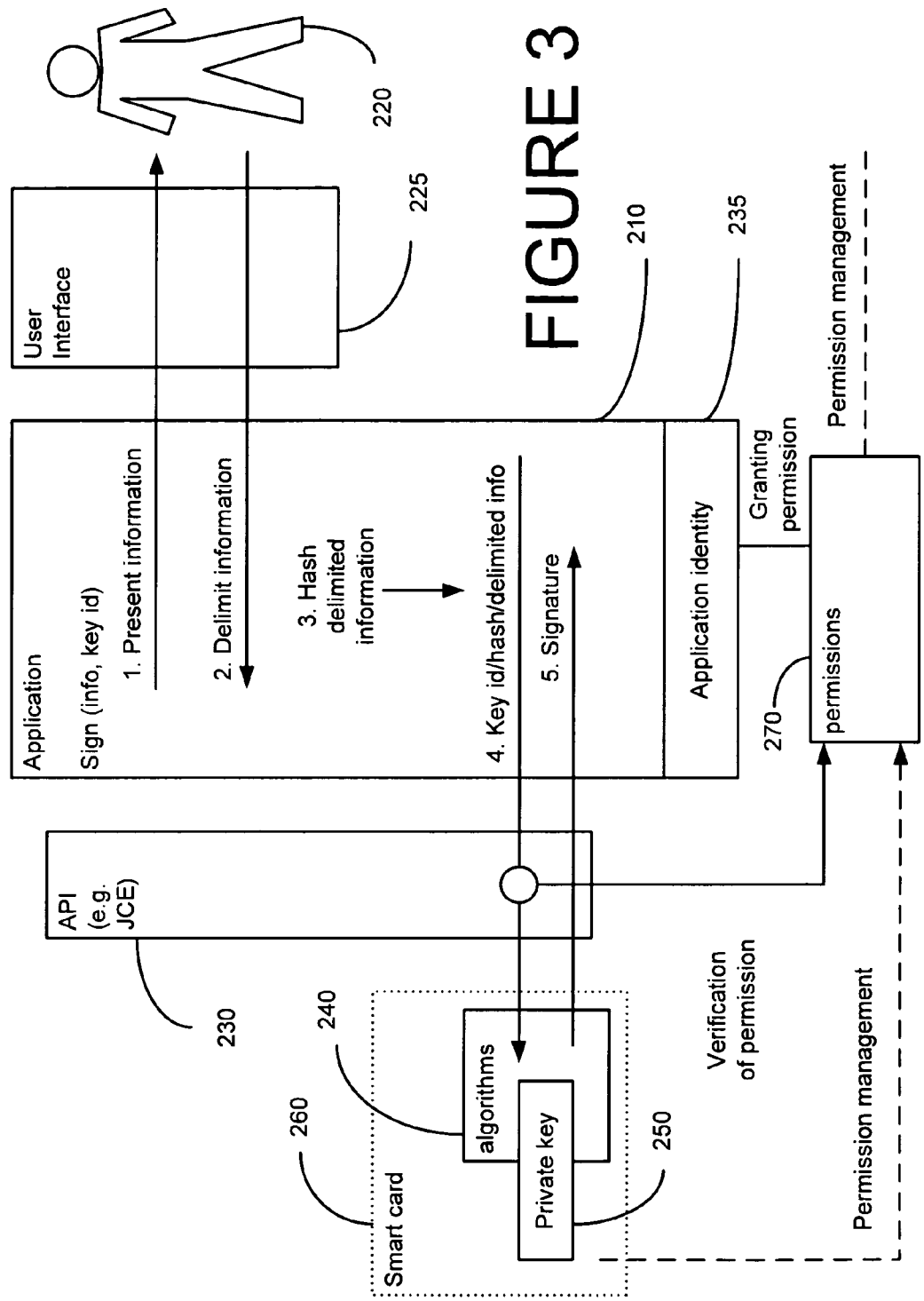
FIG. 3 is a block diagram of one embodiment of a device for implementing digital signatures according to the present invention.

FIG. 3 illustrates one sample embodiment of a device, process and computer code product producing digital signatures according to the present invention. A computer code product is a computer-readable medium having computer-readable instructions stored thereon that, upon execution by a processor, cause the processor to perform various functions such as produce digital signatures. In this example, permissions can be granted according to a policy, such as on the basis of code identity. The policy may come from, for example, from the smart card 260 or from another entity. As shown in FIG. 3, the application 210 presents the user 220 information through a user interface 225 in step 1. The user 210 delimits the information to be signed using the user interface 225 and the delimited information is returned to the application 210 in step 2. Steps 1 and 2 can be optional steps in the case where a user does not need to delimit information. For example, it may be possible to use a digital signature to authenticate a user to a server application as part of a protocol such as SSUTLS or IPSec, for example, without presenting any information to the user (the information signed is a protocol message which is not user understandable). The application 210 generates a hash value for the delimited information in step 3 and the key id, hash value, and possibly the delimited information gets passed through the API 230 to a cryptographic algorithm 240 (i.e. computer-readable instructions) stored on a smart card 260 (i.e. computer-readable medium) in step 4.

In this embodiment, the permission of the application 210 to perform a digital signature operation is also verified in step 4 by the API 230 prior to passing the key id, hash value, and delimited information to the cryptographic algorithm 240. The API 230 can be configured to check a permission file 270 to determine if the application 210 has permission to access a certain private key. In this example, permission is determined based on the application identity 235. If the application 210 is permissioned to access the private key, the API 230 passes the key id, hash value, and delimited information to the cryptographic algorithm 240. The algorithm 240 can access the private key 250 and generate a digital signature which is sent back to the application in step 5. Alternatively, the API 230 can be configured to check the permission file 270 to determine generally if the application has permission to generate a digital signature and if so, pass the key id, hash value, and delimited information to the cryptographic algorithm 240.

In this example, JAVA can provide the security model where the given code (e.g. the class, the package, etc.) can be trusted to perform certain operations. The trust can be expressed by granting this application 210, based on application identity 270, permission to generate a digital certificate. Each permission can be the instance of a respective class of permissions. Apart from classes of permission that operate on a binary basis, JAVA can provide classes of permission that can be used to control access to particular parts of the hierarchically named space. These types of permissions can be used, for example, to control access to the file system.

Permissions can be granted to applications through processes beyond control of the application. For example, an application can be assessed for its trustworthiness and permissions can be granted by a dedicated device manager or they can be granted remotely when the application is loaded. In addition, in certain cases, such as MIDP2.0 platform, permissions can be granted depending on the cryptographically verified origin of JAVA code.

In this embodiment, access to private keys used to sign data can be controlled by permissions. For example, private keys can be stored in a hierarchical namespace structure, similar to the file system so that one permission class with hierarchical namespace can be used to control access to several keys. Alternatively, each key can be stored in its individual place and separate permissions can be created to control access to the key.

In addition, as discussed herein, this embodiment limits access to the proper key to only certain trusted code. By granting such permission, the trusted code is believed to present and process information to be signed accurately and reliably. The permission to access the given key can be granted (possibly indirectly) by the owner of the key. The permission can be managed using standard mechanisms available to the current JAVA platform (e.g. by the management agent in OSGi) or, for example, by the mechanism standardized in SATSA (where the smart card provide the list of code it trusts).

This solution effectively eliminate the risks associated with rogue code because if rogue code attempts to perform a signature operation, it may present information to the user, but it will fail when it attempts to access the key. Even if such failure is intercepted by the code itself (thus becoming invisible to the user), the signature will not be forged. This embodiment also solve the problem of key scavenging.

One sample method for implementing this solution is to define a new JAVA standard permission that is designated specifically for this purpose. Alternatively, it is possible to standardize certain parts of the namespace used by one of the existing permission. This approach may be beneficial, for example, in environments like OSGi which itself provides standardization of file namespaces.

Figure 4:
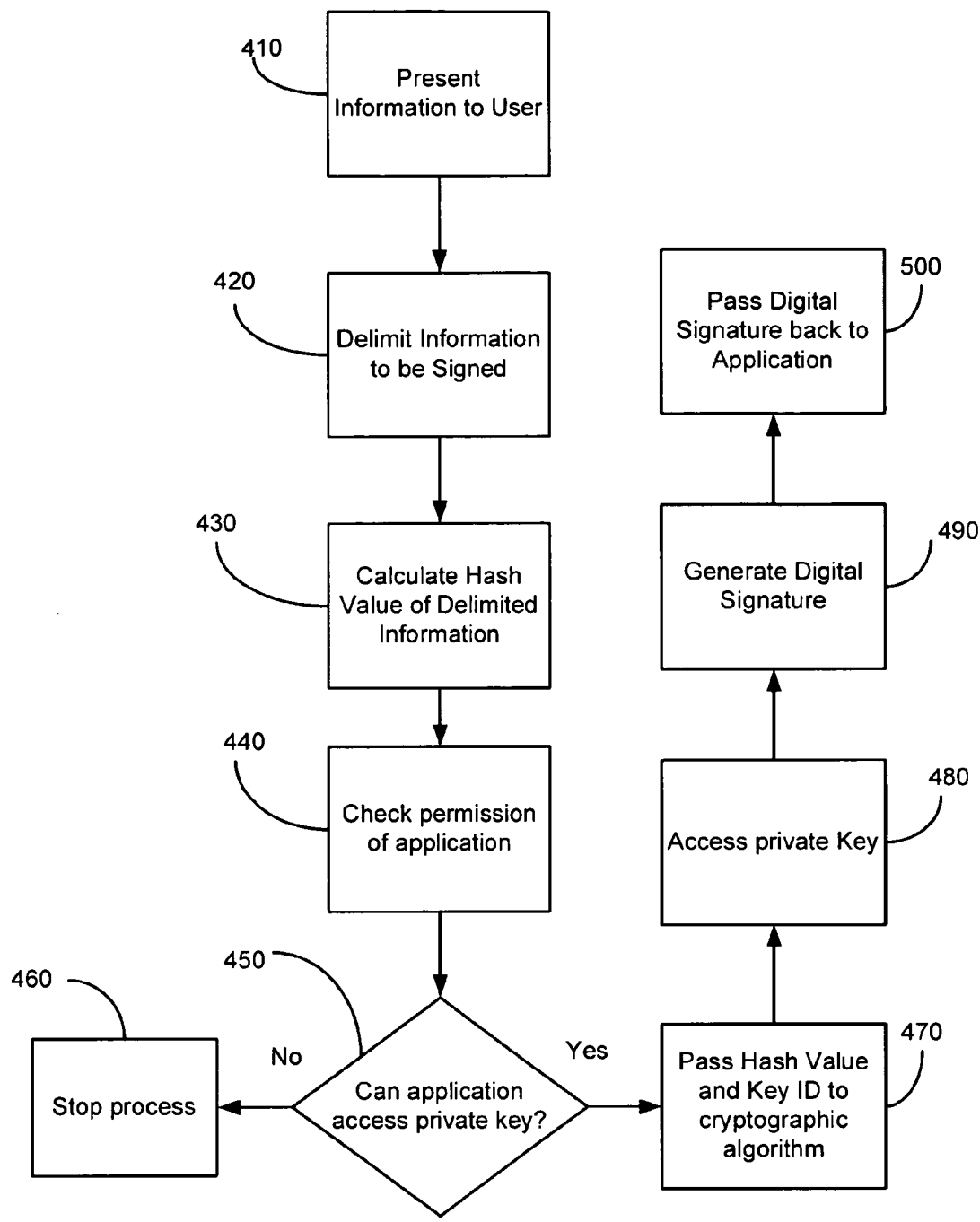
FIG. 4 is a flow chart illustrating one embodiment of a method for implementing digital signatures according to the present invention.

Another sample method for implementing this solution is to subclass one of the JAVA permissions and use it for this purpose. As this solution in not standard, it may require cooperation from the software the implements the cryptographic function. For example, the current structure of JCE assumes that each cryptographic function is implanted by so-called provider, a concept similar to plug-in functionality. If this is the implementation, the provider can verify the respective permission and proceed only if signing is allowed. In non-JAVA, non-JCP environments (such as Brew, NET, etc.) the introduction of permissions can also be implemented. A method for generating digital signatures according to one embodiment of the invention is illustrated in FIG. 4. In step 410, the user is presented with information and in step 420 the user delimits the information for which a digital signature will be created. In step 430, a hash value of the delimited information is calculated using a hash function and in step 440 the permissions of the application are checked. In step 450 the permission are checked to determine if the application has access to the private key. If the application does not have access to the private key, the method is terminated in step 460. If the application does access to the private key, the key id and hash value are passed to a cryptographic algorithm in step 470. In step 480, the private key is accessed and in step 490 a digital signature is generated based on the hash value and the private key. Finally, in step 500, the digital signature is passed back to the application.

While the exemplary embodiments illustrated in the FIGURES and described above are presently preferred, it should be understood that these embodiments are offered by way of example only. Other embodiments may include, for example, different techniques for performing the same operations. This invention in not limited to a particular embodiments, but extends to various modification, combinations, and permutations that nevertheless fall within the scope and spirit of the appended claims.

What is claimed is:

1. A non-transitory computer-readable medium having computer-readable instructions stored thereon that, upon execution by a processor, cause the processor to:
   determine a hash value corresponding to information;
   determine, based on a permission policy, whether an application associated with the information has permission to access at least one private key of a plurality of private keys, wherein the plurality of private keys are stored in a hierarchical namespace structure, and further wherein a single permission class of the permission policy is used to control access to the plurality of private keys within different parts of the hierarchical namespace structure; and
   if the application has permission to access the private key, generate a digital signature with the private key, wherein the digital signature is based at least in part on the hash value.

2. The non-transitory computer-readable medium of claim 1, wherein the plurality of private keys are stored on a smart card.

3. The non-transitory computer-readable medium of claim 1, wherein the application is configured to present the information to a user through a user interface for delimiting.

4. The non-transitory computer-readable medium of claim 1, wherein the processor is further caused to receive an identity of the application and compare the identity to the permission policy to determine whether the application has permission to access the private key.

5. The non-transitory computer-readable medium of claim 1, wherein a second private key is stored at a second location and further wherein a second permission policy is used to control access to the second private key.

6. The non-transitory computer-readable medium of claim 1, wherein the permission policy includes an identity of the application.

7. The non-transitory computer-readable medium of claim 1, wherein the permission policy is established by an owner of the private key.

8. The non-transitory computer-readable medium of claim 1, wherein the permission policy comprises an instance of a class of permission policies.

9. A method for generating a digital signature, the method comprising:
   calculating a hash value corresponding to information;
   determining, based on a permission policy, whether an application associated with the information has permission to access a private key of a plurality of private keys, wherein the plurality of private keys are stored in a hierarchical namespace structure, and further wherein a single permission class of the permission policy is used to control access to the plurality of private keys within different parts of the hierarchical namespace structure; and
   if the application has permission to access the private key, using the private key to generate a digital signature based at least in part on the hash value.

10. The method of claim 9, wherein determining whether the application has access to the private key is based at least in part on an identity of the application.

11. The method of claim 9, further comprising providing the digital signature to the application.

12. The method of claim 9, wherein the digital signature is generated by a cryptographic algorithm.

13. The method of claim 9, further comprising determining, based on a second permission policy, whether the application has access to a second private key.

14. The method of claim 9, further comprising providing the hash value and a key identifier corresponding to the private key to a cryptographic algorithm, wherein the cryptographic algorithm is used to generate the digital signature.

15. The method of claim 9, further comprising employing a dedicated device manager to administer the permission policy, wherein the dedicated device manager is independent of the application.

16. The method of claim 9, further comprising employing a security model to administer the permission policy, wherein the security model uses an identity of the application to determine whether the application has access to the private key.

17. The method of claim 9, wherein determining whether the application has permission to access the private key is performed remotely.

* * * * *

UNITED STATES PATENT AND TRADEMARK OFFICE
CERTIFICATE OF CORRECTION

PATENT NO. : 7,853,793 B2  Page 1 of 1
APPLICATION NO. : 10/838642
DATED : December 14, 2010
INVENTOR(S) : Cofta et al.

It is certified that error appears in the above-identified patent and that said Letters Patent is hereby corrected as shown below:

Title page, item (56), under "Other Publications", in Column 2, Line 18, delete "Cryptoraphy" and insert -- Cryptography --.

Column 2, line 31, delete "know" and insert -- known --.

Column 2, line 37, delete "Application," and insert -- application, --.

Column 4, line 2, delete "algorithm 10. If the key 50" and insert -- application 10. If the private key 50 --.

Column 4, line 25, delete "user 110." and insert -- user 120. --.

Column 4, line 40, delete "product" and insert -- product for --.

Column 4, line 50, delete "user 210" and insert -- user 220 --.

Column 4, line 57, delete "SSUTLS" and insert -- SSL/TLS --.

Column 5, line 19, delete "identity 270," and insert -- identity 235, --.

Column 5, line 31, delete "MIDP2.0" and insert -- MIDP 2.0 --.

Column 6, line 10, delete "NET," and insert -- .NET, --.

Signed and Sealed this
Twenty-fourth Day of May, 2011

David J. Kappos
*Director of the United States Patent and Trademark Office*